Figure 1:
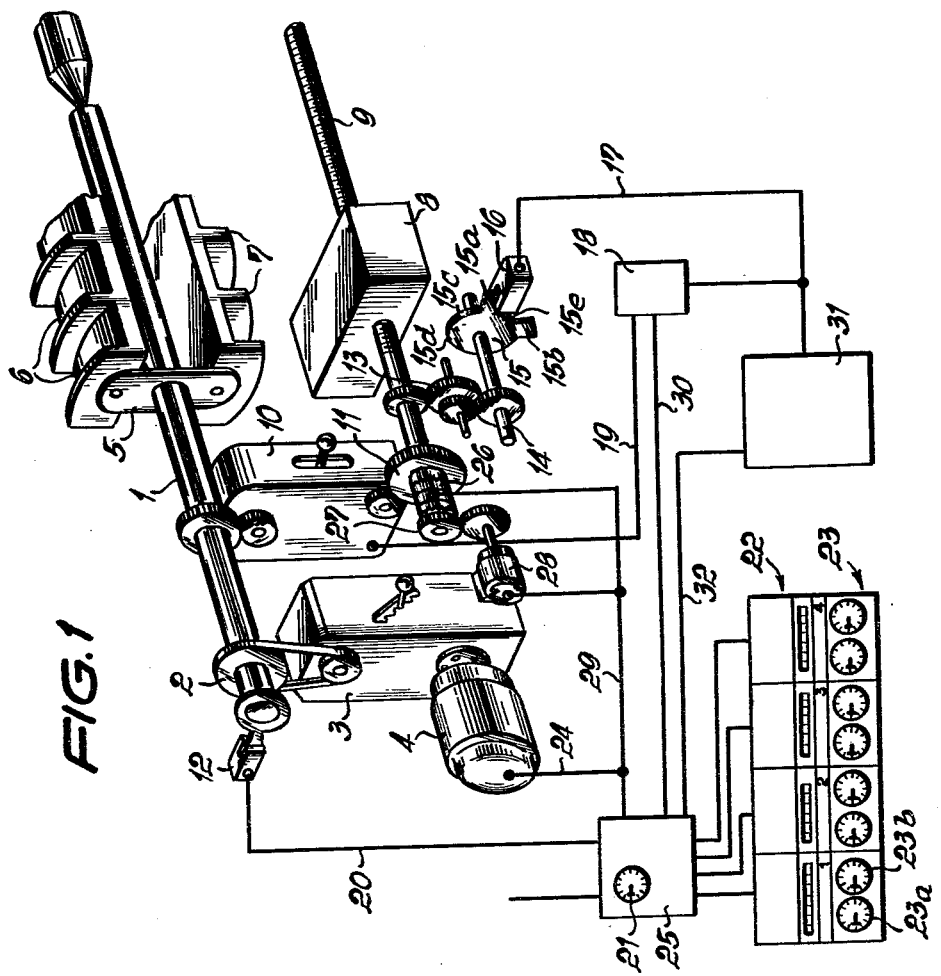

April 14, 1964     H. SCHÜMANN     3,128,956
WINDING MACHINES FOR ELECTRICAL COILS Filed Jan. 23, 1962     3 Sheets-Sheet 1

INVENTOR
Heinrich Schümann
By
Squire & Olcott
His Attorneys

April 14, 1964     H. SCHÜMANN     3,128,956
WINDING MACHINES FOR ELECTRICAL COILS Filed Jan. 23, 1962     3 Sheets-Sheet 2

INVENTOR

Heinrich Schümann

By Squire & Olcott
His Attorneys 3,128,956
WINDING MACHINES FOR ELECTRICAL COILS
Heinrich Schümann, 14a Schwartauer Allee,
Lübeck, Germany
Filed Jan. 23, 1962, Ser. No. 168,199
Claims priority, application Germany Jan. 26, 1961
5 Claims. (Cl. 242—9)

This invention relates to a winding machine for electrical coils of the type in which a motor driven working spindle rotates a winding form and is connected with counting means for counting the turns in each layer and the total number of turns of the coil and for switching off the drive motor, and in which said working spindle is drivingly connected via an adjustable reduction gear and a reversing clutch with a lead screw for moving the wire guide.

The coil winding machine for the present invention is adapted to wind coils on a form which comprises a plurality of separate winding chambers or compartments, each compartment being separated from an adjacent compartment by a partition.

A plurality of adjustably presettable counters are provided which count the turns in each layer within a particular compartment and the total number of turns wound within each compartment.

Generally, the invention provides a coil winding machine as mentioned in the beginning in which the lead screw actuates an impulse transmitter or contact which transmits at least one impulse at the beginning and one impulse at the end of each winding layer in a chamber of the winding form, one of said impulses controlling the forward movement of the wire guide moved by the lead screw, and the other impulse controlling the return movement by actuating the reversing clutch. After completing the desired number of turns and stopping the drive motor, and simultaneously disconnecting the lead screw from the working spindle, an auxiliary drive motor is coupled to the lead screw, by which drive the lead screw is rotated and the wire guide is moved in a direction towards a part of the winding form or pattern which is free of windings. Until the impulse transmitter actuated by the lead screw releases the impulse assigned to the beginning of the winding layer of the next chamber of the winding pattern, which impulse simultaneously deenergizes the auxiliary drive and disconnects it from the lead screw, the lead screw re-couples with the working spindle by means of the reduction gearing, re-energizes the drive motor, and again resumes operation of the reversing clutch for the next compartment of the winding form.

Thereby it is achieved that all of the operating functions automatically succeed one another, and may be repeated any desired number of times, after the end of the wire has been fastened on the winding pattern and the machine is started, whereby any number of winding chambers of a pattern may be wound. Thus, it is possible to operate simultaneously two or more machines, or several winding patterns respectively, whereby the coils wound on the first winding pattern may be laced and removed during the operating cycle of the machine.

In order to be able to also wind coils with a varying number of turns, as is often required, the invention provides that a plurality of adjustable counters are connectible via a controlled programming switch to an impulse transmitter cooperating with the working spindle, and causing to switch-on the drive motor when a predetermined number of turns have been wound in such a way that upon each transfer of the wire from one winding chamber to the next one automatic switching takes place from one counter to the next counter. By means of this it is possible to predetermine the desired number of turns in each coil by initially setting the associated counter. Therefore it is possible to select as many varying numbers of windings as there are counters provided. In practice however, four counters are sufficient.

In order to avoid the necessity of interchanging an impulse transmitter, or a gear of the change-speed gearing, when interchanging different winding patterns, a preferred embodiment of the invention provides an impulse counting circuit adjustable to at least two different nominal numbers, at least one impulse to be counted being fed upon each revolution of the lead screws to the impulse counting circuit by the impulse transmitter operated by the lead screw, said counted impulses transmitting control impulses to controlling means for the lead screw drive, as soon as the counted number corresponds to the set nominal number of impulses. Thereby it is achieved that the control impulses transmitted after the counted number of impulses correspond to the set nominal number, and acting upon the drive of the lead screw, i.e. causing reverse switching of the rotating direction and starting the auxiliary drive. The control impulses should always be assigned to the beginning and to the end of a winding chamber, and may be varied with respect to the lead screw by setting the electrical impulse counting circuit to a defined nominal number.

In another embodiment the impulse transmitter is mechanically coupled to the lead screw, this embodiment providing an electric coupling designed in such a way, that during each revolution of the lead screw, a series of regularly spaced impulses is transmitted and counted by the adjustable impulse counting circuit. The series may consist of four impulses or one impulse for each quarter-turn of the lead screw. If the impulse counting circuit is set to a nominal number of, for example, twenty impulses, the lead screw must make exactly five revolutions before the counting circuit is ready to transmit the impulse acting upon the control means for the drive of the lead screw. By means of this the important advantage is obtained that by setting the electrical impulse counting circuit to a defined nominal number, any desired number of revolutions of the lead screw, and therefore any desired path of the wire guide moved by the lead screw may be obtained.

Several embodiments of the invention are shown by way of example in the accompanying drawing which, for better understanding of the invention, are to be described in detail.

Figure 2:
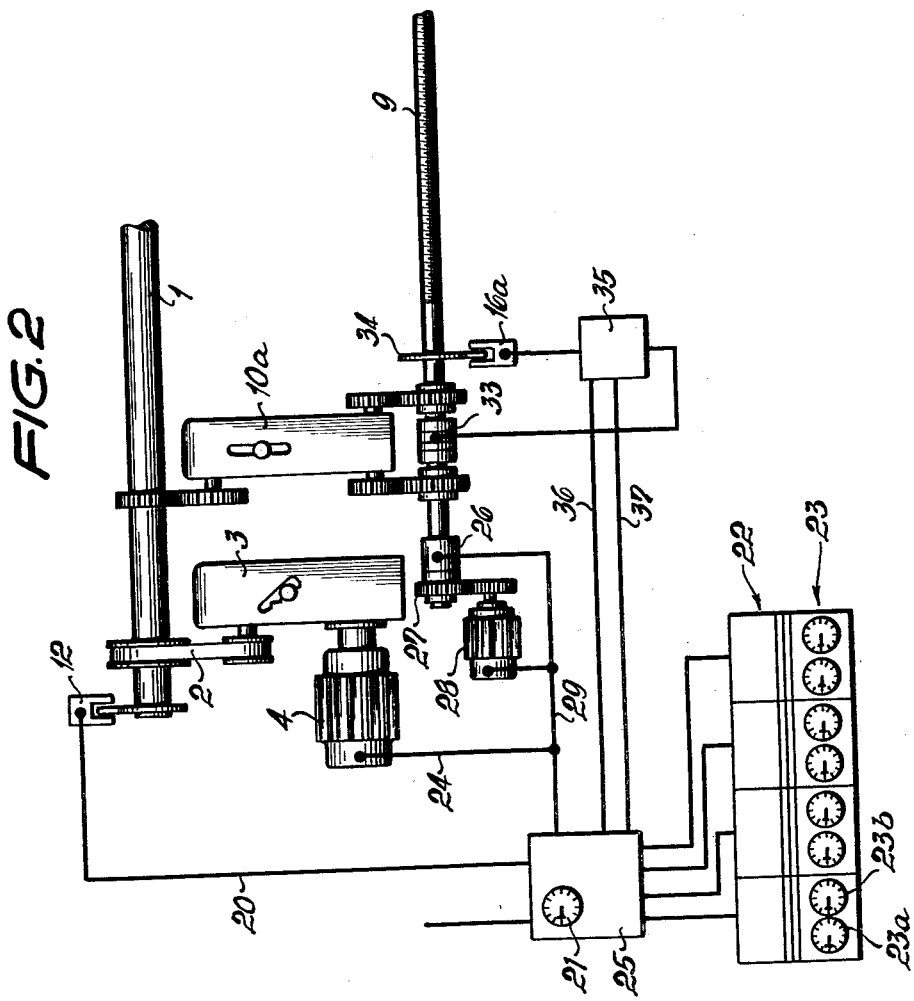
Figure 3:
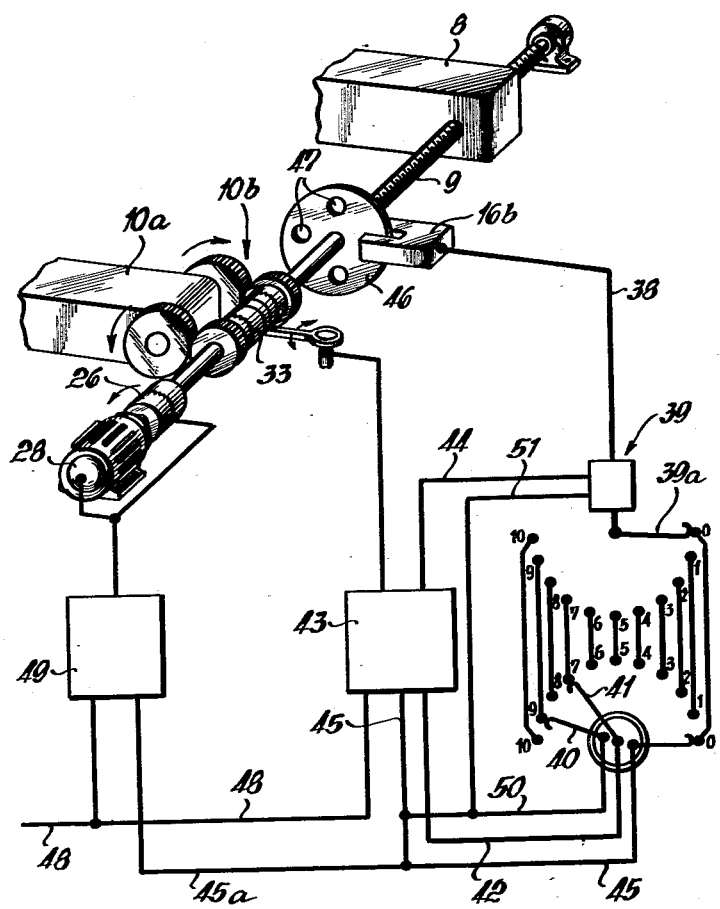

In the drawings:

FIG. 1 is a perspective view of a schematic assembly drawing of the elements of the coil winding machine according to the invention, and showing the switching arrangement of the electrical means provided for controlling the machine, FIG. 2 is a side view of a schematic assembly of the coil winding machine according to the invention, including a winding pattern, and showing a switching arrangement of the electrical control means which is modified with respect to FIG. 1, and FIG. 3 is a perspective view of a schematic assembly illustrating an arrangement for controlling the lead screw of the coil winding machine according to the invention, and showing a switching arrangement of the electrical control means of a modified embodiment with respect to FIG. 1 or FIG. 2.

The working spindle 1, which is suitably journalled in bearings in a machine frame (not shown), is driven by an electric motor 4 and a variable transmission ratio gearing 3 through a belt drive 2. The working spindle 1 carries a winding pattern 5 comprising of plurality of separate winding chambers 6 and flanges or partitions 7 arranged between adjacent winding chambers. In the drawing the winding pattern 5 for the sake of simplicity is shown to be mounted directly on the working spindle 1, while in practice the winding pattern is mounted on a surface plate connected with the working spindle.

A slide 8 carrying wire guide means (not shown), is in threaded engagement with a lead screw 9. The lead screw 9 is driven by the motor 4 along with the working spindle 1 via a continuously adjustable variable speed ratio transmission 10 and via a gear 11 mounted on the lead screw. The reduction ratio of the transmission 10 is adjusted in such a way that upon one revolution of the working spindle 1 the wire guiding slide 8 is moved by the lead screw 9 through a distance corresponding to the wire diameter.

Since it is necessary for obtaining superposed winding layers to reverse the direction of movement of the slide 8, and thus the direction of rotation of the lead screw 9 always at the ends of the layers, a reversing gear is provided in the transmission 10. Alternatively a reversing clutch as shown in FIG. 2 may be used.

The working spindle 1 is coupled with an impulse transmitter 12 consisting of an electromagnetic pick-up and an iron lug rotating with the working spindle. It is to be understood, however, that other forms of impulse producing devices may be used. It is merely important that an electrical impulse adapted for controlling purposes shall be transmitted upon each revolution of the working spindle in a predetermined angular position of the same.

The lead screw 9 cooperates with a similar impulse transmitter, which, as shown in FIG. 1, does not transmit an impulse upon each revolution of the lead screw. For this purpose a shaft 14 rotatably supported in parallel relation to the lead screw 9 is driven by a change-speed reduction gear 13. The reduction ratio of the gear 13 corresponds to ratio one to the number of revolutions of the lead screw required for exactly moving the wire guide slide 8 through the spacing of two adjacent chambers of the winding pattern. This means that the shaft 14 must exactly rotate one revolution, which the slide is moving between the two extremities of a winding chamber. Since the pitch of the lead screw is always constant and is known, the revolution ratio of the gear 13 may easily be computed, and it will always be set in such a way that the aforementioned requirement is fullfilled.

On the shaft 14 an iron disc 15 is mounted provided with two radially outwardly extending iron lugs 15a and 15b. These iron lugs 15a and 15b cooperate with an impulse transmitter pick-up or contact 16 corresponding substantially to the impulse transmitter 12. In this case also other contact making means, for example cams etc., may be used. However, in this it is important that the contacts are made in defined angular positions of the shaft 14. The ratio of the two angles included between the contact lugs 15a and 15b corresponds to the ratio between the width of the chamber and the width of the flanges between two chambers, or in other words between the width of the layer and the spacing between two layers in adjacent chambers. According to the dimensions of the winding form 5, a correspondingly designed impulse producing disc 15 must be mounted on the shaft 14.

If the above requirements are fullfilled and the machine is operating, the impulse transmitter 15, 16 will transmit an impulse at the beginning of a chamber and also upon reaching the end of the chamber, after the slide 8 has been moved in the direction towards the end of the chamber. Initially these impulses are transferred to a control device 18 which is either amplifying the impulses produced during the winding operation of the machine, or is directly leading them via a control circuit to the reversing gear 10. Thus each impulse corresponding to the count for the number of turns in a single layer causes a reversal of the rotating direction of the lead screw and the slide is reciprocated in correspondence with the width of each winding layer.

During this procedure, while the working spindle 1 is driven by the electric motor 4, the impulses of the impulse transmitter 12 actuated by the contact lug of the rotating working spindle 1 are fed via a programming selecting switch 21 to one of, for example, four counters 22. Each of these counters 22 is provided with a nominal value setting means 23 adjustable to the desired number of turns in such a way that upon reaching this set nominal value an electrical impulse is transmitted amplified by suitable means and causing via the control circuit 24 deenergizing of the drive motor 4. These counters may also be connected with a visual indicator.

A suitable relay for amplifying this impulse is indicated at 25. Simultaneously with the deenergization of the drive motor 4, the drive of the lead screw by the working spindle is disconnected by a magnetic clutch 26, or the like, i.e. the gear 11 is disengaged from the lead screw 9, and at the same time the gear 27 is coupled and a small electric motor 28 is energized through a control circuit 29 which is also connected with the relay 25 thereby driving the lead screw 9 via the gear 27.

The direction of rotation of the second electric motor 28 is selected in such a way that the lead screw 9 will move the slide 8 in a direction towards the next empty chamber of the winding pattern 5. Thereby also the shaft 14 is rotated by the gearing 13, and that in such a way that initially the lug 15a and then the lug 15b moves through the impulse transmitter 16.

Assuming now that the full member of turns of a coil in one of the pattern chambers has been wound, i.e. that the motor 4 and thereby the working spindle 1 is switched off, and the auxiliary motor 28 is switched on, the last turn of the coil may be disposed at any point along the width of the winding layer. The circumferential portion 15c of the disc 15 disposed between the lugs 15a and 15b and the reduction ratio from the lead screw to the shaft 14 corresponds to the width of the winding layer, or to the width of the pattern chamber respectively, which means that upon rotating the disc 15 through this circumferential portion 15c the slide 8 is moved over the entire width of the winding layer of the coil to be wound. If now the motor 4 is deenergized and the auxiliary motor 28 is energized, the last turn of the coil is disposed at a point which, for example, corresponds to the position of the point 15d on the disc adjacent the impulse transmitter 16. Now the disc 15 begins to rotate and the wire guiding slide 8 is moved until the wire guide has reached the position corresponding to the end of the width of the chamber. In this moment the lug 15a has reached the impulse transmitter 16 generating an impulse which is fed via the circuit 17 to a sequence switch 18 and thence via the circuit 19 to switch the reversing gear 10 in such a way that upon renewed energization of the motor 4, later to be described, the direction of rotation of the lead screw—which is still disengaged from the reversing gear—is such that the slide 8 must move in a direction towards the empty pattern chamber. The impulse is further fed through the circuit 30 to the relay 25 but excluded by the sequence switch 31 from circuit 32.

The disc 15 continues to rotate through the arc 15e defined by the two lugs 15a and 15b, and this circumferential portion 15e corresponds to the width of the flanges between the pattern chambers, i.e. the slide 8 advances about this width. After this the lug 15b reaches the impulse transmitter 16 and generates a second impulse which is fed to the relay 25 by which the drive motor 4 is energized, the auxiliary motor 28 deenergized, and the clutch 26 actuated in such a way that the lead screw 9 is connected again by the gear 11 with the transmission 10. Thereupon the next coil will be wound within the empty pattern chamber, as has been described already with respect to the first coil.

In order to achieve that this next coil may be wound with a number of turns which is different from that of the coil wound before, further counters 22 and therewith associated nominal value setting means have been provided. By the second impulse, generated by the contact lug 15b, and fed through the sequence switch 31, the selection switch or step-by-step switch 21 is actuated besides the relay 25, whereby the control circuit 20 is connected with the next counter. Then the above described working cycle is repeated.

In order to achieve deenergization of the drive motor 4, as already described, and to cause a braking effect, the speed of the machine according to the invention is reduced before the desired total number of turns has been reached. Practice has taught that the speed reduction must take place at a certain number of revolutions of the working spindle before the final deenergization and braking, depending on the inertia of the moving parts of the machine including the winding pattern 5, and the working spindle. According to the invention two nominal value setting means 23a and 23b are used for this purpose, in which the nominal value setting means 23a is set to a defined nominal value corresponding to the desired number of windings of a coil, while the nominal value setting means 23b is set to a lower number. The difference represents an empirical value derived from the slowing down of the machine, when the speed is reduced.

After reaching the number of turns to which the counter 23b has been set, a conventional means (not shown) will switch the drive motor 4 to a slower speed. Due to the inertia of the machine the working spindle 1 will keep on rotating until the end winding number, to which the nominal value setting means 23a has been set, is obtained. By suitable magnetic brakes, or other well known means, a momentary stop of the working spindle 1 in an exact predetermined angular position is obtained defined by the angle between the contact lug on the working spindle 1 and the winding pattern 5. Appropriate counters are well known in the art and any suitable type may be used.

Besides the above described embodiment of the control also two additional embodiments according to the invention are herein disclosed, functioning in a substantially similar manner. One of these additional embodiments is shown in FIG. 2.

The mechanical structure of the machine is substantially the same as that one shown in FIG. 1. In this case the combined transmission and reversing gear 10 is replaced by a solenoid actuated reversing clutch 33 having a neutral position and a separate reduction gear 10a. Besides this the adjustable ratio transmission 13 is omitted and a contact disc 34 replaces the contact disc 15 having mounted in fixed yet interchangeable manner directly on the lead screw 9. An impulse transmitter 16a is actuated by the disc 34. The impulses of this impulse transmitter 16a are amplified and fed via a combined step-by-step switch and relay 35 to the reversing clutch 33, whereby, during the operation of the machine, one impulse is transmitted upon each revolution of the lead screw. Since the pitch of the lead screw corresponds to a fraction of the width of the winding chamber, a plurality of impulses are transmitted over each width of the chamber. It is necessary that the width of the chamber and the pitch of the lead screw be kept within a suitable ratio, so that a plurality of complete revolutions of the lead screw will correspond to the width of the chamber. It is also necessary that a suitable ratio shall exist between one complete revolution of the lead screw and the width of the flange 7. If these conditions are fulfilled this machine is adapted to all winding operations within the range of the machine, without requiring any removal and replacement of parts.

Since the impulse transmitter 16a is transmitting a plurality of impulses, while the width of the chamber is traversed, it is necessary that only those impulses shall be fed to the reversing clutch 33 which are generated at the ends of the chambers. For this purpose the step-by-step switch 35 is provided, which responds to each impulse and will feed, for example, the impulses 1 and 4, which are amplified, by the relay portion and applied to the reversing clutch. Therefore, when the fourth impulse is given the rotating direction is reversed, and the step-by-step switch moves through the same series of steps in the reverse direction. Of course the example with four impulses is appropriate only for such a width of the winding chamber which will be traversed by the slide 8 when the lead screw 9 makes four revolutions.

After the last turn has been wound, the machine will be stopped in the manner described with respect to the first embodiment and the reversing clutch 33 is brought to a middle or neutral position by feeding an impulse through a control circuit 36 to the relay 25. Simultaneously the electric motor 28 is energized and the associated clutch 26 is coupled with the lead screw 9. During the subsequent rotation of the lead screw 9, causing the slide 8 to advance again to an empty pattern chamber, a series of impulses are transmitted corresponding in number to the prior position of the slide within the first winding chamber. When impulse 4 is reached—again related to the example with four lead screw revolutions for each width of winding chamber—an additional relay is switched allowing one more revolution of the lead screw. The next following impulse, which is fed via a control circuit again to the relay 25, will cause the energization of the drive motor 4. Simultaneously electric motor 28 is deenergized, the lead screw 9 is disengaged by disengaging the clutch 26 from the gear 27, and the reversing clutch 33 is moved to a position in which the slide 8 is moved forwardly again. Thereupon all control procedures are repeated.

Another embodiment is shown in FIG. 3 the operation of which is as follows:

The lead screw 9 shown in a perspective view is journalled in conventional manner and moves the wire guide slide 8. The lead screw 9 is driven by a drive mechanism 10 consisting of a gearing 10a drivingly coupled with the working spindle 1 of the machine and a reversing clutch 33. Furthermore an auxiliary drive is provided for the lead screw 9 comprising an electric motor 28 and a magnetic clutch 26.

According to the invention an impulse transmitter 16b cooperating with the lead screw 9 is adapted to transmit a plurality of impulses via the control circuit 38 to an adjustable counting switch 39. The impulse transmitter 16b, for example, is formed by a photo-control and a perforated disc 46 mounted on the lead screw 9, so that the apertures of the disc 46 will cross the light beam of the photo-control. The counting switch 39, which is adjustable to a predetermined nominal number of turns, may be formed by any mechanical counting mechanism, or any electronic counting apparatus. In this it is merely necessary that this counting switch may be set by simple adjustment means to at least two different nominal numbers of turns. For the sake of simplicity only one counting switch is shown in the drawing. It is to be understood, however, that the counting means may also be composed of more than one counting switch. The adjustment possibilities are illustrated in the drawing by the two sliding contacts 40 and 41.

The counting switch is responsive to the impulses generated by the impulse transmitter 16b and the number of impulses set at adjustable contact 41 will be obtained at a certain point. It is assumed, for example, that this point, in the simplified illustrated embodiment, will be at the contact 7 of the counting switch 39 to which the sliding contact 39a must move. At this point an impulse is generated and fed via the control circuit 42 to the control means 43 for the lead screw drive 10. This impulse causes the reversing clutch 33 to be switched from the assumed advance movement of the lead screw 9 to the return movement for the next layer, and further causes via the control circuit 44 a change in the action of the counting switch 39 in such a way that it counts anew the set number of impulses. In the illustrated example this may be achieved by switching the sliding contact 39a to return movement, i.e. by counting the impulses in reverse order, namely six, five, four etc. After reaching the zero position, which would be in response to the seventh impulse, a new impulse is generated by the counting switch which is fed via the control circuit 45 to the control means 43 causing the reversing clutch 33 to drive lead screw in the advancing direction of movement. In the illustrated example the contact 7 controls the return movement and the contact 0 controls the advance movement of the lead screw 9.

Upon reaching the original position of the counting switch, a reversal in the direction of operation takes place. This procedure is repeated successively, whereby the wire guide 8 is reciprocated between the ends of the chamber of the winding pattern. As already mentioned above, the width of the chamber may be adjusted by the sliding contact, or by analogous adjusting means. Depending on the pitch of the lead screw and the number of apertures 47 in the disc 46 of the impulse transmitter 16b must be set to a predetermined number of impulses. Preferably the entire arrangement is laid out in such a way that the length of path through which the wire guide 8 moves between two impulses fed to the counting switch 39 corresponds to an exactly defined distance, for example 1 mm. By means of the sliding contact 41 serving to adjust the path of movement to the width of the chamber, this width may be adjusted in millimeters.

The above described procedure (winding the pattern by reverse switching the rotating direction of the lead screw) is repeated until the set number of turns are obtained on the winding pattern, and an impulse is transmitted via the control circuit 48, as has been described with respect to the embodiment shown in FIGS. 1 and 2. This impulse causes the reversing clutch 33 of the lead screw drive 10 to be switched to an idling position, and the auxiliary drive 28 of the lead screw 9 and its clutch 26 to be energized by the relay 49. This causes the lead screw 9 to be moved in the advance direction and the wire guide 8 in a direction towards an empty chamber of the winding pattern. Simultaneously the counting switch 39 receives an impulse via the control duct 44 causing it to count the now following impulses in forward succession considering, however, the previously counted impulses in the forward direction. According to the switching of this embodiment this may be achieved in a simple manner by controlling the counting switch in such a manner that the sliding contact 39a rides over the associated series of contacts in forward succession regardless of whether the advance or the return movement of the lead screw was previously in effect. In this case also the start in the counting switch-gear takes place at that point, i.e. that impulse position, at which the wire guide 8 had stopped within the chamber upon reaching the last turn of the winding.

During the procedure in which the wire guide 8 is moved in a direction towards the next empty pattern chamber across the flange disposed therebetween, the impulse transmitter at the end of the chamber, which is fed via the control duct 42 to the control means 43, is made ineffective which may be achieved by a simple limit switch actuated in the idling position of the reversing clutch 33. Only after reaching a number of impulses corresponding to the position of the nominal value setting means of the adjustable contact 40, the auxiliary drive 49, 28, 26 is switched off, which is caused by an impulse fed via the control circuit 45a. Simultaneously the drive arrangement 10a, 10b of the lead screw 9 is made again operative, in the advance direction, which is achieved by connecting the control circuits 50 and 45. At the same time the counting switch 39 receives an impulse via the control circuit 51 causing the counting switch 39 to return to its initial position. This position corresponds to the beginning of the next empty chamber and is defined by the nominal value setting means 40 by setting a value corresponding to the width of the chamber plus the width of the flange.

Thereby it is possible in a machine according to the above described arrangement to adjust the automatic control arrangement of the wire guide for operation with another chamber of different dimensions, and that in a simple manner by turning a switch button. In this connection it is also possible to provide more than one counting switch 39 in one machine which, by a selecting switch, may be connected successively with the impulse transmitter 16b, and which are each adjustable to a differing dimension of the winding pattern as shown in FIG. 1, if patterns are to be used which show succsssively differing dimensions of the chambers and the flanges. With this machine it is also possible to wind any sized winding pattern without adjustment to the chamber in which case the counting switch 39 is dimensioned in such a way that the adjustment to the maximum width of the winding layer of the machine is possible.

The embodiments according to the invention are advantageous in that the slide 8 with the wire guide is always transferred to the beginning of the next following chamber after the corresponding number of turns has been wound, no matter where the wire guide has stopped. The electrical and mechanical details of the conventional elements required for this control, which has been described above, need not be set forth herein since they are readily available commercially. An especially convenient arrangement of the machine may be obtained by arranging the electrical switching elements within a separate housing and connecting them with the machine by means of cables. It should be noted that it is possible to equip existing machines with the required impulse transmitters and the special lead screw drive 28 in order to use the machine in connection with the described control.

What I claim is:

1. A coil winding machine adapted to wind wire upon a form having a plurality of separate compartments formed therein, each compartment being separated from an adjacent compartment by a separating wall, said machine comprising: a first shaft upon which said form is removably mounted; a first motor connected to drive said first shaft; a second shaft having a lead screw formed thereon, said second shaft being spaced from and extending parallel to said first shaft; wire guide means mounted for movement parallel to said shafts, said guide means being threadedly engaged with said lead screw for displacement by rotation of said second shaft to guide wire into any desired one of said compartments; reversing clutch means connecting said second shaft to be driven by said first motor along with said first shaft; first adjustably presettable counting means responsive to a first predetermined number of revolutions of said first shaft, said first number of revolutions being equal to the number of turns to be wound in a single layer in the one of said compartments into which wire is being guided by said guide means, said reversing clutch means being connected to said first counting means to cause a reversal in the direction of rotation of said second shaft each time that said first counting means responds to said first predetermined number of revolutions; second adjustably presettable counting means responsive to a second predetermined number of revolutions of said first shaft, said second number of revolutions being equal to the total number of turns to be wound in said one of said comparements; control means responsive to said second counting means for stopping rotation of said first shaft by said first motor in response to said second number of revolutions, said control means sinultaneously controlling said reversing clutch means to cause said second shaft to be disconnected for rotation independently of said first motor; a second motor controlled by said control means; further clutch means controlled by said control means for selectively connecting said second shaft to be driven by said second motor when said first shaft is stopped; third adjustably presettable counting means responsive to a third predetermined number of impulses; impulse producing means connected to said third counting means and responsive to rotation of said second shaft, said impulse producing means causing said third counting means to reach said third predetermined number in response to rotation of said second shaft by said second motor by an amount sufficient to move said guide means to guide wire into a compartment adjacent to said one compartment; said third counting means being connected to said control means to cause disconnection of said second shaft from said second motor by said further clutch means and connection of said second shaft to be driven by said first motor through said reversing clutch means, said control means thereupon stopping operation of said third counting means and causing operation of said first and second counting means to be resumed for winding wire into said adjacent compartment.

2. A coil winding machine according to claim 1, wherein said impulse producing means comprises an apertured member mounted on said second shaft for rotation therewith and photoelectric means connected to said third counting means for producing counting operation thereof, said photoelectric means comprising means producing a beam of light which is repeatedly interrupted by said apertured member during rotation of said second shaft.

3. A coil winding machine according to claim 1, further comprising adjustable speed ratio transmission means, said reversing clutch means connecting said second shaft through said transmission means to be driven by said first motor along with said first shaft, said transmission means being adjustable to provide a speed ratio which causes said guide means to be displaced by an amount which is substantially equal to the diameter of the wire being wound for each revolution of said first shaft.

4. A winding machine according to claim 1, wherein at least one of said counting means consists of a plurality of separate counters each of which is individually presettable, said winding machine further comprising sequence switching means responsive to the predetermined counted number in one of said separate counters to render another separate counter operative.

5. A coil winding machine adapted to wind wire upon a form having a plurality of separate compartments formed therein, each compartment being separated from an adjacent compartment by a separating wall, said machine comprising: a first shaft upon which said form is removably mounted; a first motor connected to drive said first shaft; a second shaft having a lead screw formed thereon, said second shaft being spaced from and extending parallel to said first shaft; wire guide means mounted for movement parallel to said shafts, said guide means being threadedly engaged with said lead screw for displacement by rotation of said second shaft to guide wire into any desired one of said compartments; reversing clutch means connecting said second shaft to be driven by said first motor along with said first shaft; first adjustably presettable counting means responsive to a first predetermined number of revolutions of said first shaft, said first number of revolutions being equal to the number of turns to be wound in a single layer in the one of said compartments into which wire is being guided by said guide means, said reversing clutch means being connected to said first counting means to cause a reversal in the direction of rotation of said second shaft each time that said first counting means responds to said first predetermined number; second adjustably presettable counting means responsive to a second predetermined number of revolutions of said first shaft, said second number of revolutions being less than the total number of turns to be wound in said one of said compartments by an amount substantially equal to but less than the number of turns which will be wound by said machine with said first motor operating at reduced speed; third adjustably presettable counting means responsive to a third predetermined number of revolutions of said first shaft, said third predetermined number being equal to the total number of turns to be wound in said one of said compartments; control means responsive jointly to said second and said third counting means for reducing the speed of said first motor in response to said second number of revolutions and stopping rotation of said first shaft in a predetermined position of rotation thereof in response to said third predetermined number of revolutions, said control means controlling said reversing clutch means simultaneously with said stopping of said first shaft to cause said second shaft to be disconnected for rotation independently of said first motor; a second motor controlled by said control means; a further clutch means controlled by said control means for selectively connecting said second shaft to be driven by said second motor when said first shaft is stopped; fourth adjustably presettable counting means responsive to a fourth predetermined number of impulses; impulse producing means connected to said fourth counting means and responsive to rotation of said second shaft, said impulse producing means causing said fourth counting means to reach said fourth predetermined number in response to rotation of said second shaft by said second motor by an amount sufficient to move said guide means to guide wire into a compartment adjacent to said one compartment, said fourth counting means being connected to said control means to cause disconnection of said second shaft from said second motor by said further clutch means and connection of said second shaft to be driven by said first motor through said reversing clutch means, said control means thereupon stopping operation of said fourth counting means and causing operation of said first, second and third counting means to be resumed for winding wire into said adjacent compartment.

References Cited in the file of this patent

UNITED STATES PATENTS

| | | |
|---|---|---|
| 2,971,711 | Hauer | Feb. 14, 1961 |
| 2,979,275 | Bigland et al. | Apr. 11, 1961 |
| 3,011,728 | Klinksiek | Dec. 5, 1961 |